(12) United States Patent
Asuncion et al.

(10) Patent No.: US 8,917,803 B1
(45) Date of Patent: Dec. 23, 2014

(54) CIRCUITS AND METHODS FOR CHARACTERIZING A RECEIVER OF A COMMUNICATION SIGNAL

(75) Inventors: Santiago G. Asuncion, San Ramon, CA (US); Mustansir Fanaswalla, Campbell, CA (US); Brandon L. Fernandes, Santa Clara, CA (US); Vaibhav Kamdar, Campbell, CA (US); Ray L. Jacinto, Gilroy, CA (US)

(73) Assignee: Xilinx, Inc., San Jose, CA (US)

( * ) Notice: Subject to any disclaimer, the term of this patent is extended or adjusted under 35 U.S.C. 154(b) by 636 days.

(21) Appl. No.: 13/100,053

(22) Filed: May 3, 2011

(51) Int. Cl.
*H04L 7/00* (2006.01)
(52) U.S. Cl.
USPC ........... 375/354; 375/229; 375/230; 375/231; 375/232; 375/233; 375/350; 375/355; 375/356; 375/367; 375/368
(58) Field of Classification Search
USPC ......... 375/229–233, 346, 350, 355, 360, 367, 375/368
See application file for complete search history.

(56) References Cited

U.S. PATENT DOCUMENTS

| | | | |
|---|---|---|---|
| 7,308,060 B1 | 12/2007 | Wall et al. | |
| 7,782,932 B2 | 8/2010 | Payne et al. | |
| 8,219,846 B2 | 7/2012 | Feng | |
| 2002/0126784 A1 | 9/2002 | Brazeau et al. | |
| 2003/0128021 A1 | 7/2003 | Tan et al. | |
| 2005/0108600 A1 | 5/2005 | Arguelles | |
| 2007/0047680 A1 | 3/2007 | Okamura | |
| 2007/0160173 A1 | 7/2007 | Takeuchi | |
| 2008/0069196 A1 | 3/2008 | Choi | |
| 2008/0175310 A1 | 7/2008 | Okamura et al. | |
| 2009/0002082 A1* | 1/2009 | Menolfi et al. | 331/57 |
| 2009/0019326 A1* | 1/2009 | Boudon et al. | 714/704 |
| 2009/0196387 A1 | 8/2009 | Mccune, Jr. | |
| 2010/0023826 A1 | 1/2010 | Noguchi | |
| 2010/0027606 A1* | 2/2010 | Dai et al. | 375/232 |
| 2010/0097087 A1 | 4/2010 | Hogeboom et al. | |
| 2010/0329325 A1 | 12/2010 | Mobin et al. | |
| 2011/0293285 A1 | 12/2011 | Aronson et al. | |
| 2011/0311009 A1 | 12/2011 | Flynn et al. | |
| 2012/0072784 A1* | 3/2012 | Li et al. | 714/704 |
| 2012/0201289 A1* | 8/2012 | Abdalla et al. | 375/233 |
| 2013/0279551 A1 | 10/2013 | Fujimori et al. | |

OTHER PUBLICATIONS

U.S. Appl. No. 13/030,558, filed Feb. 18, 2011, Klein, Matthew H. et al., Xilinx, Inc., 2100 Logic Drive, San Jose, CA 95124 USA.
George, Donald A., et al., "An Adaptive Decision Feedback Equalizer", IEEE Transactions on Communication Technology, vol. Com-19, No. 3, Jun. 1971, pp. 281-293.
U.S. Appl. No. 13/630,144, filed Sep. 28, 2012, Asuncion, Santiago et al., Xilinx, Inc., 2100 Logic Drive, San Jose, CA, 95124, USA.

\* cited by examiner

*Primary Examiner* — Daniel Washburn
*Assistant Examiner* — Eboni Hughes
(74) *Attorney, Agent, or Firm* — LeRoy D. Maunu

(57) ABSTRACT

Circuits and methods characterize a receiver. The circuit includes a decision feedback equalizer (DFE) circuit, a clock and data recovery (CDR) circuit, a data checker, and an eye-scan controller. The DFE circuit generates a filtered signal from the communication signal. The filtered signal is a sum of the communication signal and a variable weighting of a symbol recently sampled from the filtered signal. The CDR circuit samples a sequence of sampled symbols from the filtered signal. The CDR circuit samples the filtered signal at a variable phase relative to a clock signal. The data checker generates an indication of an error in the sequence of sampled symbols. The eye-scan controller varies the variable weighting and the variable phase through multiple value combinations. The eye-scan controller checks for the indication of the error for each of the value combinations.

15 Claims, 7 Drawing Sheets

CIRCUITS AND METHODS FOR CHARACTERIZING A RECEIVER OF A COMMUNICATION SIGNAL

FIELD OF THE INVENTION

One or more embodiments generally relate to serial data communication, and more particularly to characterizing a receiver of a data communication.

BACKGROUND

A high-speed serial receiver samples incoming data symbols at some phase of the high-speed clock generated from the PLL. The PLL uses a reference clock to produce the high-speed clock. The edge transitions (recovered clock) between incoming data symbols can be recovered using the high-speed clock. To properly sample the incoming data symbols, the receiver should sample the incoming data symbols between the edge transitions in the stream of incoming data symbols. The range of sampling phases for which the high-speed serial receiver properly recovers the incoming data symbols gives the margin for the sampling phase.

To check the margin of the sampling phase, external test equipment can inject sinusoidal jitter or bounded uncorrelated jitter (BUJ) into the timing of data symbols sent to the high-speed serial receiver. The high-speed serial receiver recovers the sampling clock from the incoming data symbols using a low-pass filter that rejects injected jitter placed above the cut-off frequency of the low-pass filter. Thus, the injected jitter can vary the timing of the data symbols without appreciably affecting the timing of the recovered sampling clock. The range of magnitudes of the injected jitter for which the high-speed serial receiver properly recovers the data symbols gives the margin of the sampling phase. To check that the data symbols actually captured by the high-speed serial receiver match the data symbols that the external test equipment transmits to the high-speed serial receiver, the captured data symbols must be looped back to the external test equipment.

It is time consuming and difficult to determine the margin of the sampling phase because external test equipment is required and because the tested receiver must generally include a transmitter supporting a loopback mode for returning the actually captured data symbols back to the external test equipment.

SUMMARY

In one embodiment, a circuit characterizes a receiver. The circuit includes a decision feedback equalizer (DFE) circuit, a clock and data recovery (CDR) circuit, a data checker, and an eye-scan controller. The DFE circuit generates a filtered signal from the communication signal. The filtered signal is a sum of the communication signal and a variable weighting of a symbol recently sampled from the filtered signal. The CDR circuit samples a sequence of sampled symbols from the filtered signal. The CDR circuit samples the filtered signal at a variable phase relative to a clock signal. The data checker generates an indication of an error in the sequence of sampled symbols. The eye-scan controller varies the variable weighting and the variable phase through multiple value combinations. The eye-scan controller checks for the indication of the error for each of the value combinations.

In one embodiment, a communication characterization circuit includes a transmitter and a receiver. The transmitter serially transmits a first sequence of pseudo-random binary symbols on a communication signal. The receiver is coupled to the transmitter via the communication signal. The receiver includes a decision feedback equalizer (DFE) circuit, a clock and data recovery (CDR) circuit, a data checker, and an eye-scan controller. The DFE circuit generates a filtered signal from the communication signal. The filtered signal is a sum of the communication signal and a variable weighting of a binary symbol recently sampled from the filtered signal. The CDR circuit samples a second sequence of sampled binary symbols from the filtered signal. The CDR circuit samples the filtered signal at a variable phase relative to a clock signal. The data checker generates a third sequence of pseudo-random binary symbols. The data checker generates an indication of an error in the second sequence of sampled binary symbols in response to the second sequence of sampled binary symbols not matching the third sequence of pseudo-random binary symbols. The eye-scan controller varies the variable weighting and the variable phase through multiple value combinations. The eye-scan controller checks for the indication of the error for each of the value combinations.

In one embodiment, a method of characterizing a receiver of a communication signal is described. A variable weighting and a variable phase are varied through multiple value combinations. A filtered signal is generated from the communication signal. The filtered signal is a sum of the communication signal and the variable weighting of a binary symbol recently sampled from the filtered signal. A first sequence of binary symbols is sampled from the filtered signal at the variable phase relative to a clock signal. A second sequence of pseudo-random binary symbols is generated. An indication of an error in the first sequence of sampled binary symbols is generated in response to the first sequence of sampled binary symbols not matching the second sequence of pseudo-random binary symbols. The method checks for the indication of the error for each of the value combinations.

It will be appreciated that various other embodiments are set forth in the Detailed Description and Claims which follow.

BRIEF DESCRIPTION OF THE DRAWINGS

Various aspects and advantages will become apparent upon review of the following detailed description and upon reference to the drawings in which.

DETAILED DESCRIPTION OF THE DRAWINGS

One or more embodiments determine the margin of the sampling phase and further determine the "internal eye diagram" of the high-speed serial receiver. When the analog values and transitions of the received data symbols are accumulated and displayed over a unit interval, the resulting display is denoted an "internal eye diagram" because the rising and falling transitions at the beginning and end of the unit interval frame the general shape of an open eye. The eye diagram gives the margin of the sampling phase as half of the timing width of the eye, and enables selection of an operating point with optimum margin.

Further embodiments describe internal eye-scan measuring the internal eye diagram at the receiver using Bit Error Rate (BER) testing inside a programmable integrated circuit. Internal eye-scan is a receiver margin test where the measurements and calculations are performed within the integrated circuits. It provides direct measurements at the receiver, reduces test time, and eliminates expensive test equipment.

The embodiments provide the ability to characterize upstream circuits (e.g. linear equalizer) using the determined optimum operating point, in-circuit characterization and dynamic tuning of receiver in an end-user application, and improved production screening of the receivers within programmable integrated circuits.

Figure 1:
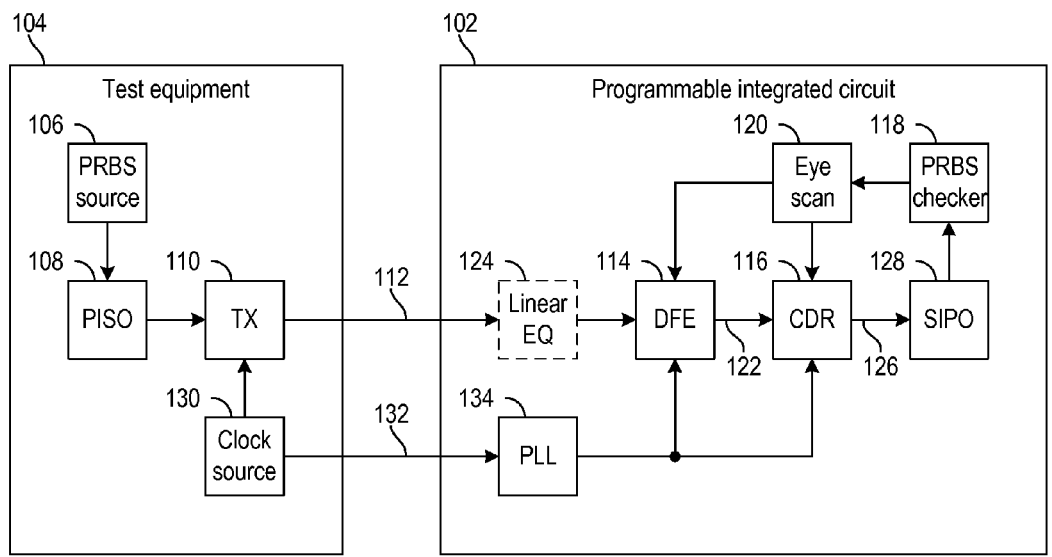
FIG. 1 is a block diagram of a synchronous communication characterization circuit.

FIG. 1 is a block diagram of a synchronous communication characterization circuit. To characterize a receiver in programmable integrated circuit 102, external test equipment 104 provides test inputs to the receiver.

Data source 106 of test equipment 104 generates a parallel data pattern including a series of words, and the parallel-in serial-out buffer 108 serializes the parallel data pattern into a pseudo-random binary sequence (PRBS) of binary symbols. Transmitter 110 of test equipment 104 serially transmits the sequence of pseudo-random binary symbols on the communication signal on line 112. In one embodiment, the communication signal on line 112 is a communication channel including a differential pair of signals. Test equipment 104 can add sinusoidal jitter (SJ) or bounded uncorrelated jitter (BUJ) to test for receiver margin.

The programmable integrated circuit 102 implements a receiver coupled to the transmitter 110 via the communication signal on line 112. The receiver includes a decision feedback equalizer (DFE) circuit 114, a clock and data recovery (CDR) circuit 116, a PRBS data checker 118, and an eye-scan controller 120.

The DFE circuit 114 generates a filtered signal on line 122 from the communication signal on line 112. The filtered signal on line 122 is a sum of the communication signal on line 112 and a variable weighting of a binary symbol recently sampled from the filtered signal on line 122. In one embodiment, the receiver also includes the optional linear equalizer 124 that attenuates low frequencies and/or amplifies high frequencies, and the filtered signal on line 122 is a sum of the communication signal on line 112 after equalization by linear equalizer 124 and a variable weighting of a binary symbol recently sampled from the filtered signal on line 122.

The CDR circuit 116 samples the filtered signal on line 122 and outputs a received sequence of sampled binary symbols on line 126. The CDR circuit 116 samples the filtered signal on line 122 at a variable phase relative to a clock signal. The serial-in parallel-out buffer 128 deserializes the received sequence of sampled binary symbols on line 126 into a series of received words.

The clock source 130 of test equipment 104 provides the clock signal on line 132, and the transmitter 110 of test equipment 104 serially transmits the transmitted sequence of pseudo-random binary symbols in synchronization with the clock signal on line 132. The phase-locked loop (PLL) 134 generates a clock signal generally matching the phase of the clock signal on line 132, and PLL 134 generates a clock signal that is synchronous with the transitions of the communication signal on line 112. The CDR circuit 116 varies the phase of the clock signal from PLL to sample the received sequence of sampled binary symbols.

The PRBS data checker 118 generates a check sequence of pseudo-random binary symbols that matches the sequence of pseudo-random binary symbols that transmitter 110 transmits on the communication signal on line 112. In one embodiment, the PRBS data source 106 and the PRBS data checker 118 implement the same linear feedback shift register (LFSR) with feedback taps based on a specific primitive polynomial. However, the check sequence of pseudo-random binary symbols might not match the received sequence of sampled binary symbols on line 126 when the sampled binary symbols have bit errors. The PRBS data checker 118 generates an indication of such bit errors in the received sequence of sampled binary symbols when the check sequence does not match the received sequence.

The eye-scan controller 120 varies the variable weighting of the DFE circuit 114 and the variable phase of the CDR circuit 116 through various value combinations. Because the symbols transmitted on line 112 are synchronized with the clock signal from PLL 134, the eye-scan controller 120 can extract the internal eye diagram by scanning both the feedback weighting of DFE circuit 114 and the sampling phase of the CDR circuit 116. The eye-scan controller 120 determines a respective value of the indication of an error for each value combination for the variable weighting and the variable phase.

In one embodiment, the eye-scan controller 120 selects an operating point for the variable weighting and the variable phase as a function of the indication of the error for all of the value combinations. After the eye-scan controller 120 selects the operating point the transmitter 110 serially transmits user data in a sequence of binary symbols on the communication signal on line 112, and the DFE circuit 114 and the CDR circuit 116 respectively use the selected weighting and the selected phase for the operating point. This is useful when the test equipment 104 is a test operating mode of an integrated circuit, and in a normal operating mode the integrated circuit communicates with programmable integrated circuit 102 via the communication signal on line 112.

In one embodiment, programmable integrated circuit 102 implementing the receiver includes an array of programmable logic and interconnect resources, and the eye-scan controller 120 is implemented within these programmable logic and interconnect resources.

Figure 2:
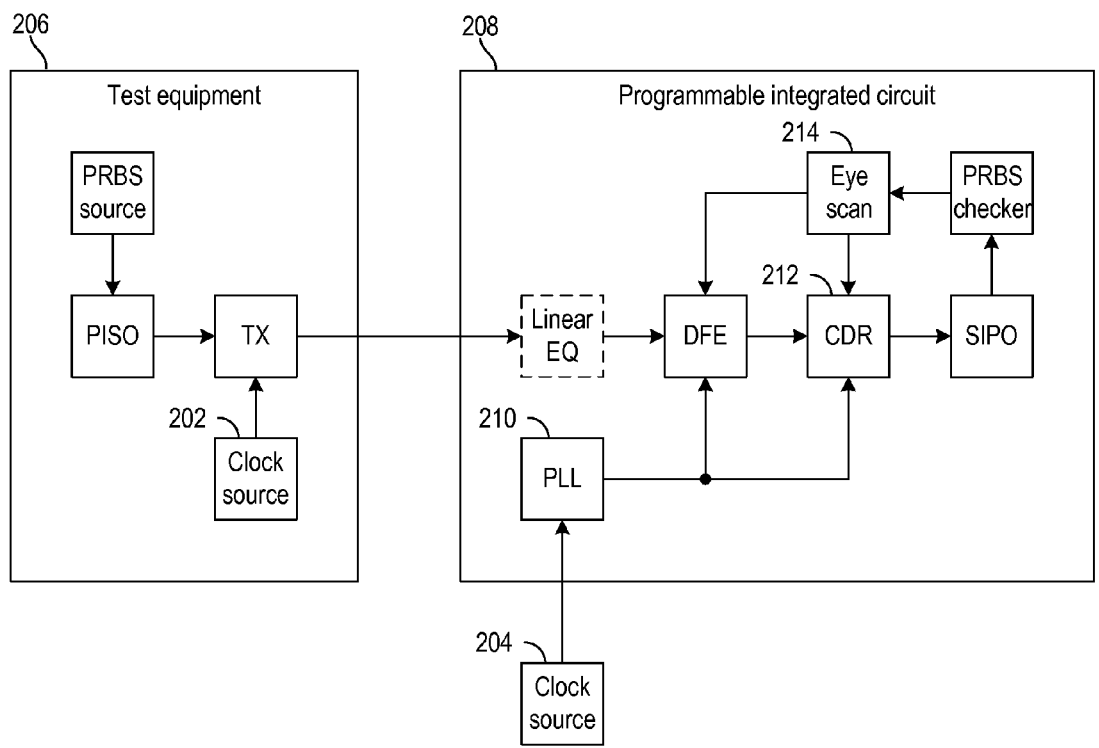
FIG. 2 is a block diagram of an asynchronous communication characterization circuit.

FIG. 2 is a block diagram of an asynchronous communication characterization circuit. While FIG. 1 has a single clock source 130 for both the test equipment 104 and the receiver in programmable integrated circuit 102, FIG. 2 instead has separate clock sources 202 and 204 for the test equipment 206 and the programmable integrated circuit 208, respectively. In one embodiment, a remote oscillator of clock source 202 and a local oscillator of clock source 204 have plesiochronous frequencies with respective tolerance drifts from the same nominal frequency.

Because test equipment 206 transmits symbols that are asynchronous to the clock signal from PLL 210, the CDR circuit 212 cannot successfully sample the transmitted symbols at a fixed phase of the clock signal from PLL 210. Instead, the CDR circuit 212 aligns a variable phase with the transitions between the transmitted symbols, and samples about halfway between the transitions during normal operation. In an embodiment with plesiochronous frequencies for clock sources 202 and 204, the variable sampling phase is often monotonically increasing or monotonically decreasing at a rate equaling the frequency difference between clock sources 202 and 204.

To generate the internal eye diagram, the eye-scan controller 214 varies a sampling phase through various phase offsets from the variable phase of the transitions between the transmitted symbols. The eye-scan controller 214 varies the sampling phase together with a DFE feedback weighting, and the eye-scan controller 214 varies the sampling phase and the DFE feedback weighting through various value combinations.

Other than the differences discussed above, the asynchronous communication characterization circuit of FIG. 2 operates similarly to the synchronous communication characterization circuit of FIG. 1.

In another embodiment not shown, a synchronous communication characterization circuit includes a receiver that directly recovers a clock signal from the transmitted symbols without receiving a clock signal from a remote or local oscillator. In one example, the receiver includes a PLL that generates a clock signal having transitions locked in phase with the transitions between the transmitted symbols. An eye-scan controller varies a sampling phase of the generated clock signal and a DFE feedback weighting through various value combinations.

Figure 3:
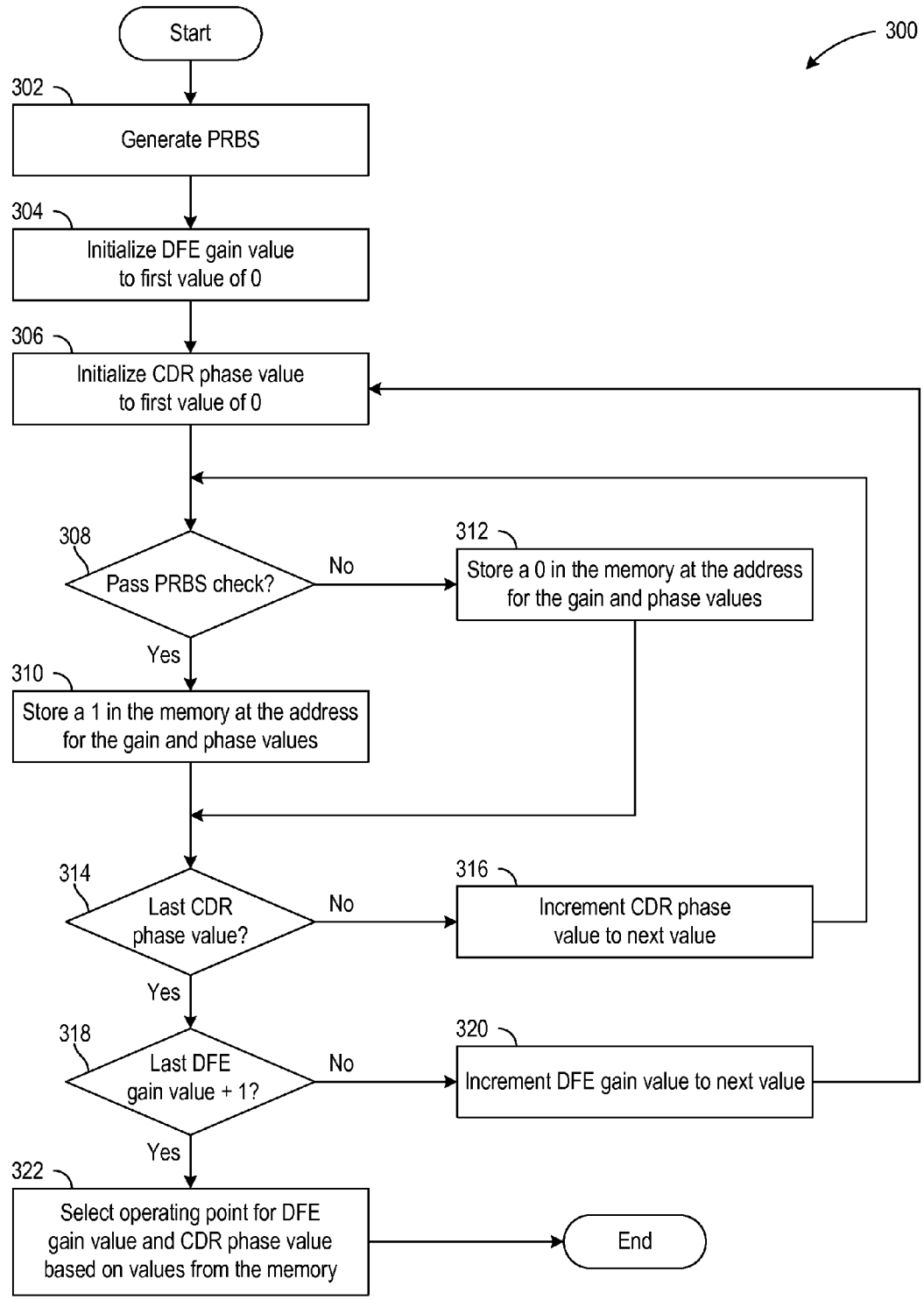
FIGS. 3 and 4 are flow diagrams of processes for characterizing a receiver of a communication signal.

FIG. 3 is a flow diagram of a process 300 for characterizing a receiver of a communication signal. The receiver is characterized by determining whether the received sequence of sampled symbols has a bit error for each value combination for the variable weighting and the variable phase.

At block 302, a sequence of pseudo-random binary symbols is generated and transmitted on a communication signal, and the receiver receives this sequence of pseudo-random binary symbols. In one embodiment, a generic transmitter generates and transmits a known pseudo-random binary sequence (PRBS).

A filtered signal is generated that is a sum of the communication signal and a variable weighting of a binary symbol recently sampled from the filtered signal. A received sequence of sampled binary symbols is sampled from the filtered signal at a variable phase relative to a clock signal. An indication of an error in the received sequence of sampled binary symbols is generated when the received sequence does not match a generated check sequence of pseudo-random binary symbols.

At block 304, the variable weighting is initialized to the first DFE gain value of zero. At block 306, the variable phase is initialized to the first CDR phase value of zero.

Decision block 308 checks the error indication for the current variable weighting and the current variable phase. When the check passes because no error is indicated, process 300 proceeds to block 310. When an error in the received sequence is indicated, process 300 proceeds to block 312.

In one embodiment, the indication indicates whether there is a lack of a bit error in the received sequence of sampled symbols during a time interval in which the filtered signal is generated using the variable weighting of the current value combination and the received sequence of sampled signals is sampled using the variable phase of the current value combination.

At block 310, a value of one is stored in a memory at an address corresponding to the current variable weighting and the current variable phase. At block 312, a value of zero is similarly stored in a memory at the address corresponding to the current variable weighting and the current variable phase. In one embodiment, the address is incremented after storing each value at either block 310 or block 312.

Decision block 314 checks whether the current phase value is the last possible phase value. In one embodiment, a CDR circuit provides a range of possible phase values for sampling a communication signal. When there is another possible phase value, process 300 proceeds to block 316 to increment the phase value to the next phase value in the range, and then process 300 returns to decision block 308.

Decision block 318 checks whether the current variable weighting is the last possible DFE gain value. In one embodiment, a DFE circuit provides a range of possible gain values for negative feedback from a recently sampled signal. When there is another possible gain value, process 300 proceeds to block 320 to increment the gain value to the next gain value in the range, and then process 300 returns to block 306 to reinitialize the phase value to zero. Thus, blocks 304, 306, 314, 316, 318, and 320 varying the variable weighting and the variable phase through various value combinations.

After checking for the indication of the error for each value combination for the gain value and the phase value, process 300 proceeds to block 322. At block 322, an operating point is selected for the variable weighting and the variable phase as a function of the indication of the error for each of the value combinations. In one embodiment, the DFE gain value of the selected weighting and the CDR phase value of the selected phase are set to the selected operating point based on the values stored in the memory at blocks 310 and 312. In one example, the error indications for the value combinations are plotted in a graph depicting the internal eye diagram, and the centroid of the passing gain and phase values provides the operating point. The receiver then begins receiving user data in one embodiment.

Figure 4:
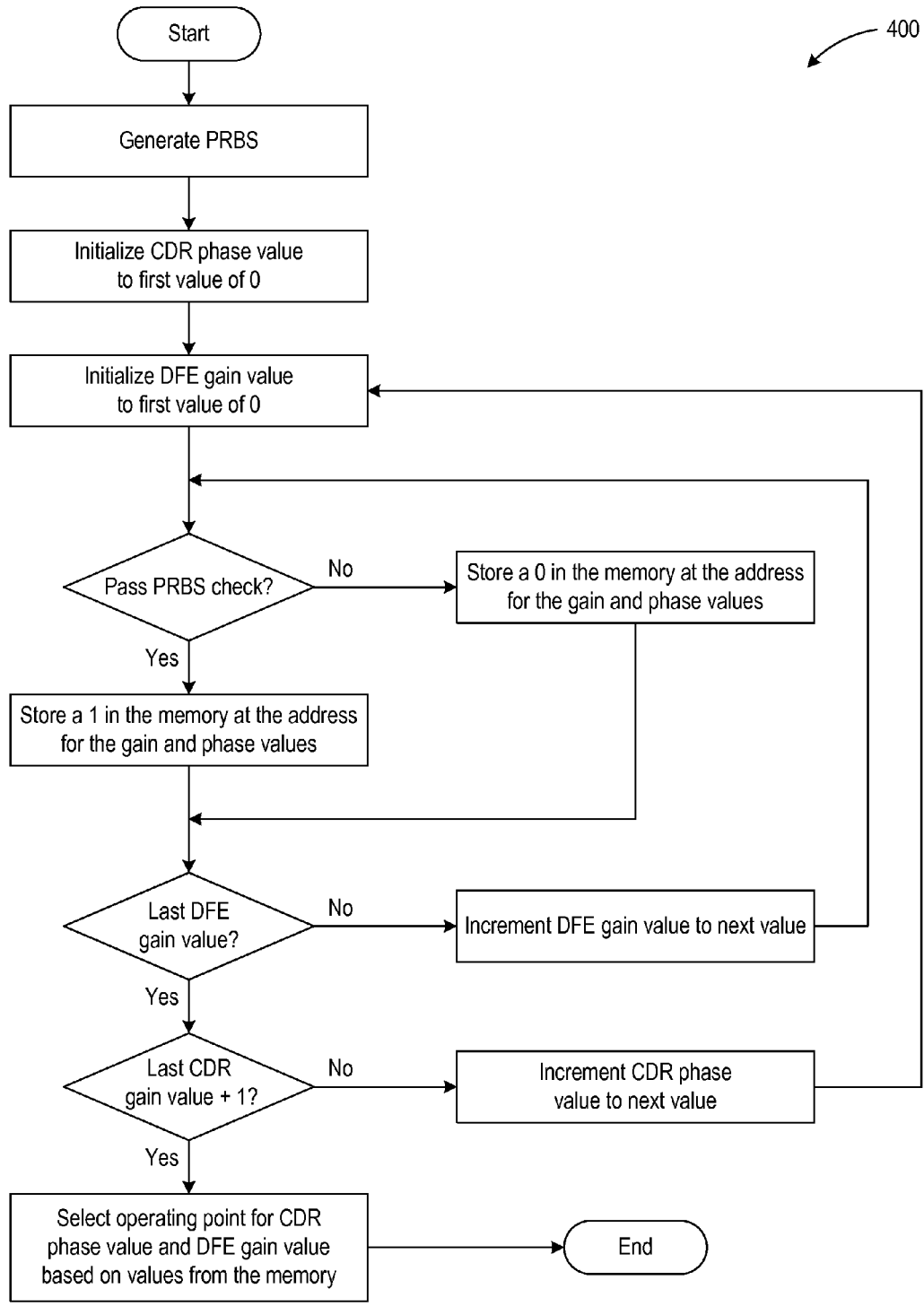

FIG. 4 is a flow diagram of another process 400 for characterizing a receiver of a communication signal. Process 400 for characterizing a receiver is similar to process 300 of FIG. 3, but the order of sweeping the variable weighting and the variable phase are interchanged between FIG. 3 and FIG. 4. While FIG. 3 sweeps the variable phase through all values for each gain value of the variable weighting, FIG. 4 instead sweeps the variable weighting through all gain values for each value of the variable phase. Both FIG. 3 and FIG. 4 exhaustively vary the variable weighting and the variable phase through all possible value combinations for the variable weighting and the variable phase.

Figure 5:
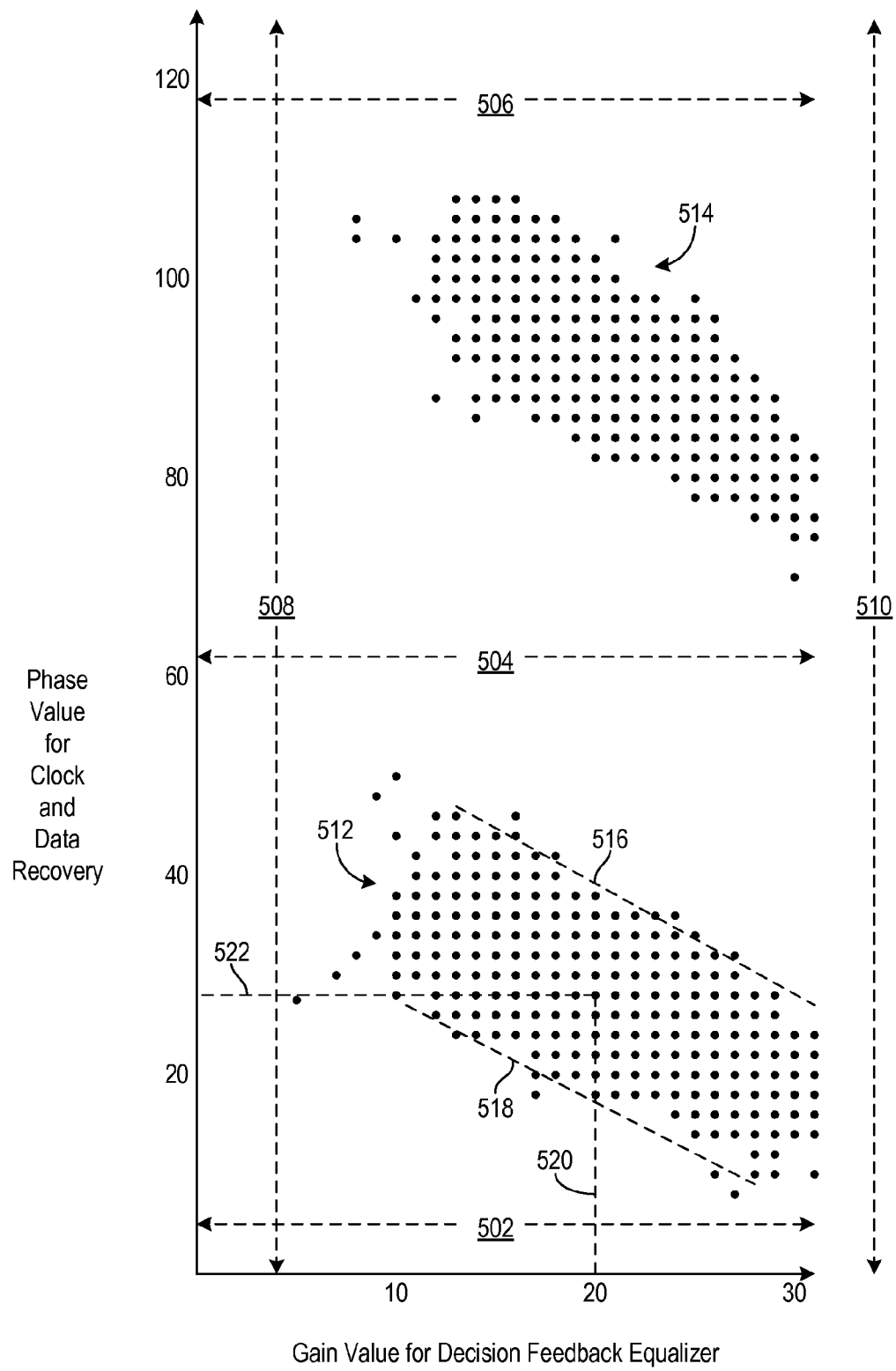
FIG. 5 is an example graph showing a lack of error indication for value combinations of a variable weighting and a variable phase.

FIG. 5 is an example graph showing a lack of error indication for value combinations of a variable weighting and a variable phase. In this example, a long communication channel couples the communication signal from the transmitter to the receiver. The possible gain values of the variable weighting appear along the horizontal axis, and the possible values of the variable phase appear along the vertical axis. For this example, a DFE circuit provides 32 possible gain values for the variable weighting, and the CDR circuit provides 128 possible values for the variable phase. For each value combination the variable weighting and the even values of the variable phase, the graph of FIG. 5 shows a dot when there is no error indication at the value combination. For clarity, FIG. 5 omits the odd values of the variable phase.

In this example graph, the possible values for the variable phase range over approximately two unit intervals of the symbols. Multiples of this unit interval separate the transitions between symbols. The low values of the variable phase in region 502 yield an error indication regardless of the gain value for the variable weighting because sampling occurs while the filtered signal is transitioning at the beginning of the first unit interval. Similarly, region 504 has an error indication because the intermediate values of the variable phase produce sampling while the filtered signal is transitioning between the first and second unit interval, and region 506 has an error indication because sampling occurs while the filtered signal is transitioning at the end of the second unit interval.

The possible gain values for the variable weighting range begin in region 508 with gain values providing no feedback or a small amount of negative feedback from a recently sampled signal. The low gain values for the variable weighting in region 508 yield an error indication regardless of the value for the variable phase because the filtered signal transitions too slowly between symbols to achieve a signal amplitude above noise at any sampling phase. This colloquial term for this situation is that the internal eye diagram has a "closed eye."

As the gain values for the variable weighting are increased to the right of region 508, the negative feedback causes the filtered signal to transition more quickly to achieve a signal amplitude above noise at certain sampling phases. The negative feedback "opens the eye" by sharpening the transitions between symbols.

While the negative feedback sharpens a transition between two symbols that necessarily have different binary values, the negative feedback reduces the signal amplitude of the second of two successive symbols with the same binary value. If the negative feedback is too strong, then the signal amplitude of this second symbol reduces below noise at any sampling point. This would occur in region 510 if the DFE circuit provided higher gain values than the DFE circuit actually provides in this example. Thus, for a gain value giving negative feedback that is too strong for proper sampling because an error is indicated at every possible value of the variable phase, this gain value indirectly indicates the signal amplitude or height of the internal eye diagram.

The dots for the lack of error indication are clustered into two clusters 512 and 514. Cluster 512 represents value combinations for the variable weighting and the variable phase that properly sample each symbol in the first unit interval, and cluster 514 similarly represents value combinations that properly sample each symbol in the next unit interval.

For increasing gain values for the variable weighting, the corresponding increasing negative feedback sharpens the transitions between symbols. The sharpened transition at the beginning of a unit interval advances the time and reduces the phase at which proper sampling begins for the unit interval, and the sharpened transition at the end of a unit interval similarly reduces the phase at which proper sampling ends for the unit interval. Thus, the range of phase values giving proper sampling shifts to decreasing phase values as the gain values increase. This accounts for the negative slope of both the upper limit 516 and the lower limit 518 of the error-free range of phase values over the possible gain values for the variable weighting. Limits 516 and 518 form the linear time invariant property of the DFE gain value that the signal is phase shifted in time.

At a particular gain value for the variable weighting, such as gain value 520, the range of phase values giving proper sampling between limits 516 and 518 indicates the timing width of the internal eye diagram. In one embodiment, an operating point is selected to have the value 522 of the variable phase that is a median within a contiguous vertical range of phase values giving proper sampling, and the operating point is selected to have the gain value 520 of the variable weighting that is a median within a contiguous horizontal range of gain values giving proper sampling. Thus, the value 522 of the variable phase of the operating point is a median of a subset of the value combinations giving proper sampling at the gain value 520, and the gain value 520 of the variable weighting of the operation point is a median of a subset of the value combinations giving proper sampling at the value 522 of the variable phase.

In one embodiment, a value of one is stored in a memory array at an address corresponding to the value combination for each dot, and values of zero are stored in the memory array at addresses corresponding to the value combinations without a dot. The operating point for the variable weighting and the variable phase is selected as a function of the values stored in the memory array.

Figure 6:
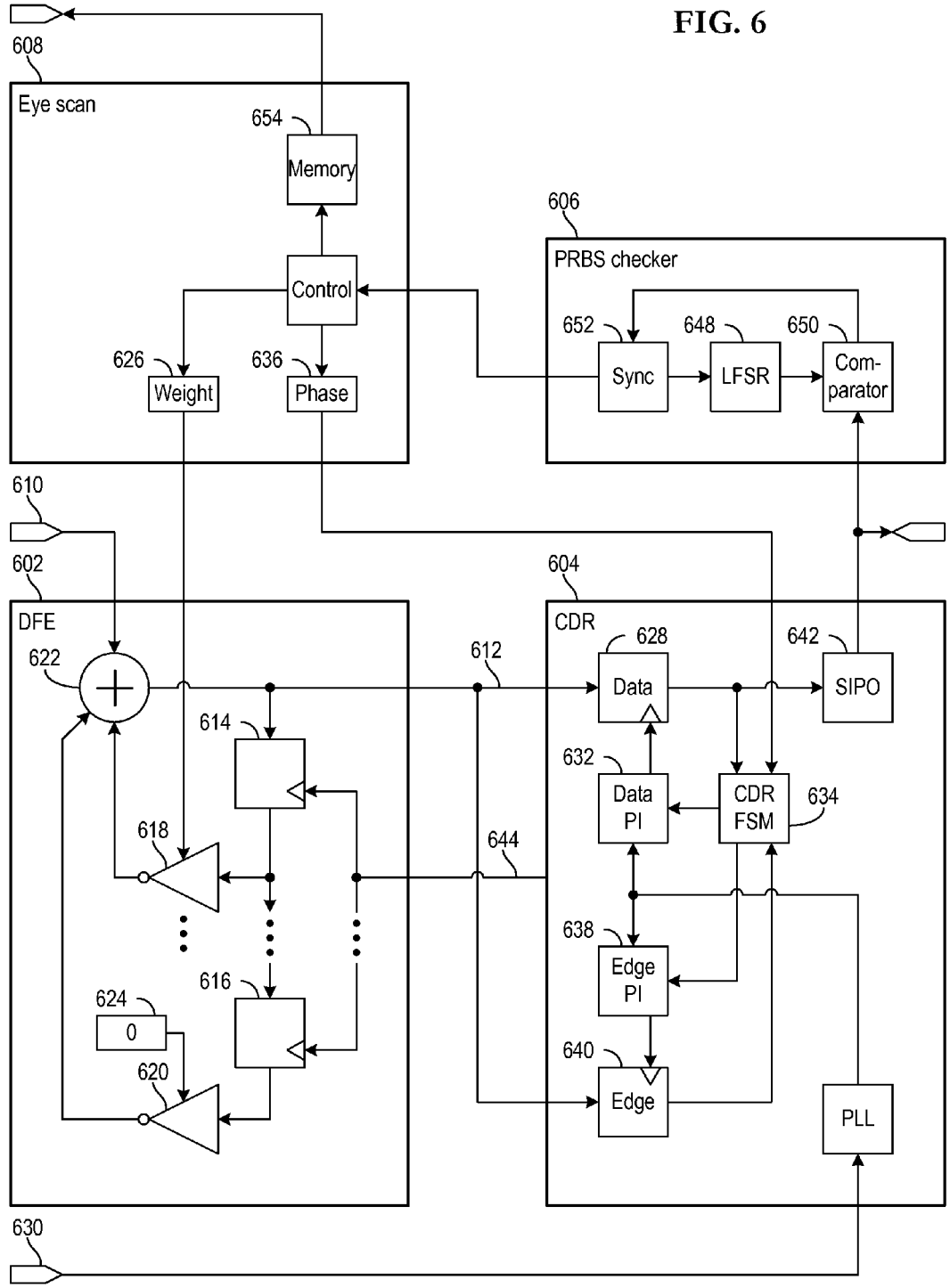
FIG. 6 is a block diagram of circuit for characterizing a receiver.

FIG. 6 is a block diagram of circuit for characterizing a receiver. The receiver includes a decision feedback equalizer (DFE) circuit 602 and a clock and data recovery (CDR) circuit 604. A data checker 606 and an eye-scan controller 608 help characterize the receiver.

The DFE circuit 602 is coupled to a communication signal 610, and is configured to generate a filtered signal on line 612 from the communication signal 610. In one embodiment, the DFE circuit 602 includes a serial shifter having registers 614 through 616. Register 614 at a beginning of the serial shifter samples a symbol directly from the filtered signal on line 612, and each register 616 stores a less recently sampled symbol. The registers 614 through 616 are coupled to respective amplifiers 618 through 620. The respective amplifier 618 through 620 for each register 614 through 616 has a variable gain that scales the respective recently sampled symbol stored in the register by a respective weighting. The summing circuit 622 generates the filtered signal on line 612 that is a sum of the communication signal 610 and the outputs from the amplifiers 618 through 620. Thus, the DFE circuit 602 is configured to generate the filtered signal on line 612 that is the sum of the communication signal 610 and respective weightings of the recently sampled symbols stored in registers 614 through 616.

During normal operation, the negative feedback from the recently sampled symbols stored in registers 614 through 616 compensates for inter-symbol interference and for attenuation of the high-frequency components of the communication signal 610. In one embodiment, only the most recently sampled symbol stored in register 614 is used to characterize the receiver, while feedback from the remaining recently sampled symbols is disabled during receiver characterization by setting each weight register 624 to zero. Thus, for characterization of the receiver, the filtered signal on line 612 is a sum of the communication signal 610 and a weighting from register 626 of the most recently sampled symbol from register 614.

The register 628 of CDR circuit 604 samples a sequence of sampled symbols from the filtered signal on line 612. The CDR circuit 604 is configured to sample the filtered signal on line 612 at a variable phase relative to a clock signal 630. The serial-in parallel-out buffer 642 generates a series of words from the sequence of sampled symbols.

In one embodiment, the communication signal 610 provides a sequence of symbols that is synchronized to the clock signal 630. The CDR circuit 604 includes a phase interpolator 632 configured to generate the variable sampling phase from the clock signal 630 as a function of an offset value from the finite state machine of alignment circuit 634. In this embodiment, the eye-scan controller 608 causes the alignment circuit 634 to set the offset value to the variable value from register 636.

In another embodiment, the communication signal 610 provides a sequence of symbols that is asynchronous to the clock signal 630 because the sequence of symbols is synchronized to an independently generated clock signal. Another phase interpolator 638 generates a second variable phase from the clock signal 630 as a function of a second offset value from the alignment circuit 634. Edge-sampling register 640 samples a second sequence of sampled symbols from the filtered signal on line 612 at the second variable phase from phase interpolator 638. The alignment circuit 634 compares the sequences of symbols sampled by registers 628 and 640, and varies the second offset value to keep the second variable phase aligned with the transitions of the filtered signal on line 612. In this embodiment, the eye-scan controller 608 causes the alignment circuit 634 to set the offset value of phase interpolator 632 equal to the varying second offset value plus the variable value from register 636.

In one embodiment, the CDR circuit 604 includes an additional phase interpolator similar to phase interpolators 632 and 638. The additional phase interpolator generates a sampling phase on line 644 halfway between the transitions of the filtered signal on line 612, and the registers 614 through 616 of the DFE circuit 602 sample the filtered signal on line 612 using this sampling phase.

The data checker 606 is configured to generate an indication of an error in the sequence of sampled symbols from CDR circuit 604. In one embodiment, the data checker includes a linear feedback shift register 648, a comparator 650, and a synchronization circuit 652. The linear feedback shift register 648 is configured to generate a sequence of pseudo-random binary symbols that matches the sequence of pseudo-random binary symbols transmitted to communication signal 610. The pseudo-random binary symbols in the sequence from linear feedback shift register 648 are shifted as a function of an alignment signal. The comparator 650 is configured to generate an indication that the sequence from linear feedback shift register 648 currently matches the sequence of sampled symbols from CDR circuit 604. The synchronization circuit 652 is configured to generate the alignment signal that shifts the sequence from linear feedback shift register 648 until the comparator 650 indicates that this sequence currently matches the sequence of sampled symbols from CDR circuit 604.

The eye-scan controller 608 is configured to vary the variable weighting in register 626 and the variable phase in register 636 through various value combinations, and the eye-scan controller 608 is configured to check for the indication of the error from data checker 606 for each of the value combinations.

In one embodiment, the eye-scan controller 608 is configured to exhaustively vary the variable weighting in register 626 and the variable phase in register 636 through all possible value combinations for the variable weighting and the variable phase. The eye-scan controller 608 is configured to determine, for each value combination of a variable weighting and a variable phase, whether the indication for the value combination indicates a lack of the error in the sequence of sampled symbols during a time interval in which the DFE circuit 602 generates the filtered signal on line 612 using the variable weighting value stored in register 626 and the CDR circuit 604 samples the sequence of sampled signals using the variable phase value stored in register 636.

In one embodiment, the eye-scan controller 608 includes a memory 654 configured to store a value array including the indication of the error for each value combination, and the eye-scan controller 608 is configured to select an operating point for the variable weighting and the variable phase as a function of the value array stored in the memory 654. In one example, an area of passing value combinations is approximated by a parallelogram, and the operating point is set to the centroid of the parallelogram.

Figure 7:
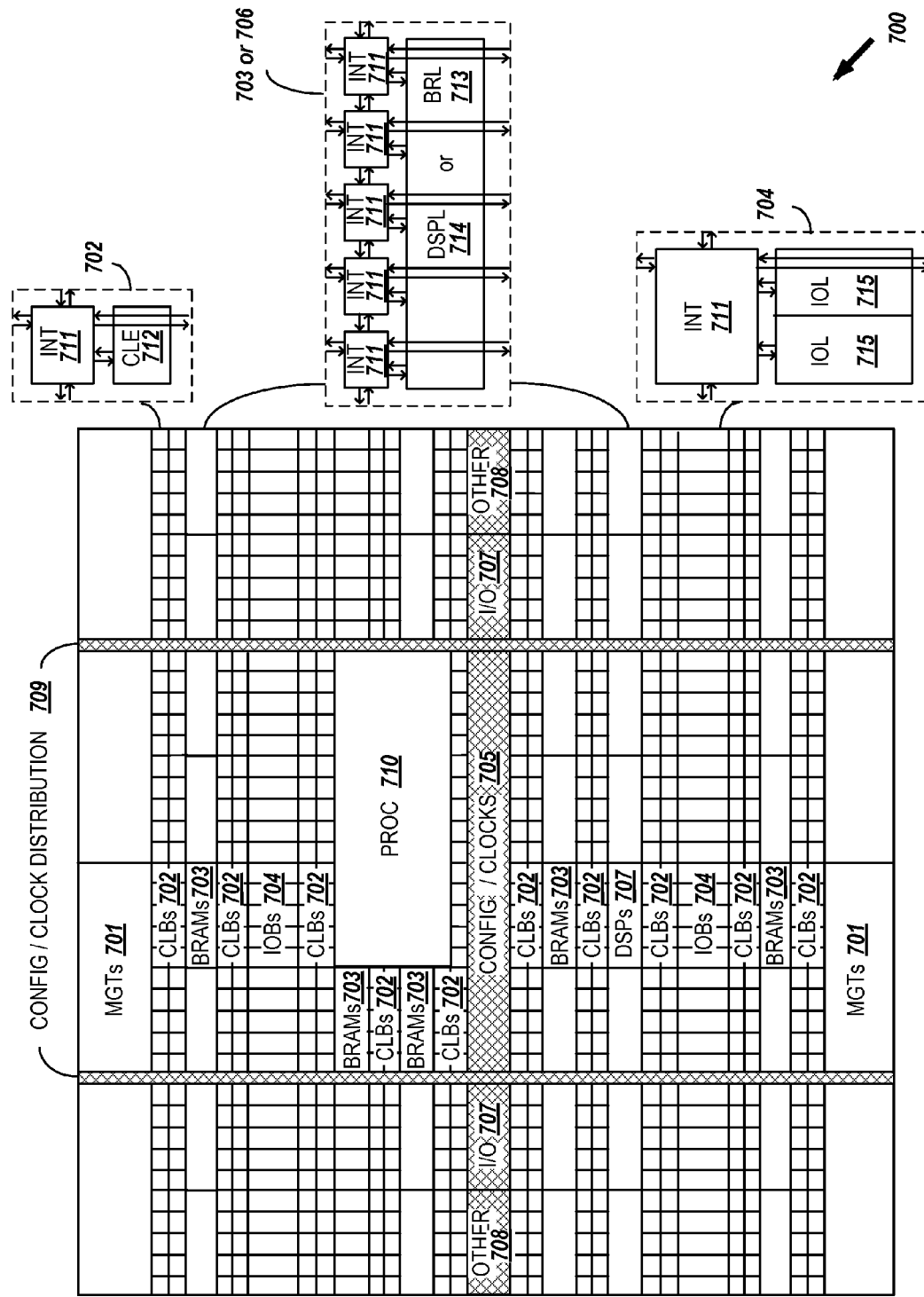
FIG. 7 is a block diagram of an example programmable integrated circuit configurable to implement a receiver and a circuit for characterizing the receiver.

FIG. 7 is a block diagram of an example programmable integrated circuit configurable to implement a receiver and a circuit for characterizing the receiver. The illustrated programmable integrated circuit is referred to as a Field Programmable Gate Array (FPGA). FPGAs can include several different types of programmable logic blocks in the array. For example, FIG. 7 illustrates an FPGA architecture (700) that includes a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized input/output blocks (I/O) 707, for example, e.g., clock ports, and other programmable logic 708 such as digital clock managers, analog-to-digital converters, system monitoring logic, and so forth. Some FPGAs also include dedicated processor blocks (PROC) 710 and internal and external reconfiguration ports (not shown).

In some FPGAs, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA. The INT 711 also includes the connections to and from the programmable logic element within the same tile, as shown by the examples included at the top of FIG. 7.

For example, a CLB 702 can include a configurable logic element (CLE) 712 that can be programmed to implement user logic plus a single INT 711. A BRAM 703 can include a BRAM logic element (BRL) 713 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 706 can include a DSP logic element (DSPL) 714 in addition to an appropriate number of programmable interconnect elements. An 10B 704 can include, for example, two instances of an input/output logic element (IOL) 715 in addition to one instance of the INT 711. As will be clear to those of skill in the art, the actual I/O pads connected, for example, to the IOL 715 are manufactured using metal layered above the various illustrated logic blocks, and typically are not confined to the area of the IOL 715.

In the pictured embodiment, a columnar area near the center of the die (shown shaded in FIG. 7) is used for configuration, clock, and other control logic. Horizontal areas 709 extending from this column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, the processor block PROC 710 shown in FIG. 7 spans several columns of CLBs and BRAMs.

Note that FIG. 7 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual FPGA more than one adjacent column of CLBs is typically included wherever the CLBs appear, to facilitate the efficient implementation of user logic.

In one embodiment, an MGT 701 includes the characterized receiver and certain CLBs 702 are configured to implement the eye-scan controller and the PRBS data checker using error indications stored in a BRAM 703.

The embodiments are thought to be applicable to a variety of systems for characterizing a receiver. Other aspects and embodiments will be apparent to those skilled in the art from consideration of the specification. The embodiments may be implemented as one or more processors configured to execute software, as an application specific integrated circuit (ASIC), or as a logic on a programmable logic IC. It is intended that the specification and illustrated embodiments be considered as examples only, with a true scope and spirit of the embodiments being indicated by the following claims.

What is claimed is:

1. A circuit for characterizing a receiver, comprising:
a decision feedback equalizer (DFE) circuit coupled to a communication signal, the DFE circuit configured to generate a filtered signal from the communication signal, wherein the filtered signal is a sum of the communication signal and a variable weighting of a symbol recently sampled from the filtered signal;
a clock-and-data recovery (CDR) circuit coupled to the DFE circuit, the CDR circuit configured to produce a sequence of sampled symbols from sampling the filtered signal at a variable phase relative to a clock signal;
a data checker coupled to the CDR circuit, the data checker configured to generate an indication of an error in the sequence of sampled symbols; and
an eye-scan controller coupled to the DFE and CDR circuits and the data checker, wherein the eye-scan controller is configured to vary the variable weighting and the variable phase through a plurality of value combinations, and the eye-scan controller is configured to check for the indication of the error for each of the plurality of value combinations;
wherein the eye-scan controller:
is configured to exhaustively vary the variable weighting and the variable phase through all possible value combinations of the plurality of value combinations;
is configured to determine, for each value combination of the variable weighting and the variable phase, whether the indication for the value combination indicates a lack of the error in the sequence of sampled symbols during a time interval in which the DFE circuit generates the filtered signal using the variable weighting and the CDR circuit samples the filtered signal using the variable phase; and
includes a memory configured to store a value array including the indication of the error for each of the plurality of value combinations, and the eye-scan controller is configured to select an operating point for the variable weighting and the variable phase as a function of the value array stored in the memory.

2. The circuit of claim 1, wherein the communication signal provides a sequence of symbols that is synchronized to the clock signal.

3. The circuit of claim 1, wherein the DFE circuit is configured to sample the recently sampled symbol from the filtered signal at another phase relative to the clock signal, and the other phase is offset one-half a unit interval from each of a plurality of transitions of the filtered signal, the plurality of transitions being separated by multiples of the unit interval.

4. The circuit of claim 3, wherein:
the DFE circuit is configured to generate the filtered signal that is the sum of the communication signal and a respective weighting of each of the plurality of recently sampled symbols; and
the eye-scan controller is configured to vary the variable weighting that is the respective weighting of a most recently sampled one of the plurality of recently sampled symbols, and the eye-scan controller is configured to set the respective weighting to zero for each of the plurality of recently sampled symbols other than the most recently sampled one.

5. The circuit of claim 3, wherein the DFE circuit includes:
a serial shifter including a plurality of registers, the register of the plurality of registers at a beginning of the serial shifter configured to sample the recently sampled symbol from the filtered signal, and each register of the plurality of registers configured to store a respective recently sampled symbol;
a plurality of amplifiers coupled to the plurality of registers, respectively, each amplifier configured to generate an output that scales the recently sampled symbol stored in the respective register by a respective weighting; and
a summing circuit coupled to the communication signal and the plurality of amplifiers, the summing circuit configured to generate the filtered signal that is a sum of the communication signal and the output from each of the plurality of respective amplifiers;
wherein the eye-scan controller is further configured to vary the variable weighting that is the respective weighting of the amplifier that is coupled to the register at the beginning of the serial shifter, and is configured to set to zero the respective weightings of the plurality of amplifiers other than the amplifier coupled to the register at the beginning of the serial shifter.

6. The circuit of claim 1, wherein the CDR circuit includes:
a phase interpolator configured to generate the variable phase from the clock signal as a function of an offset value;
a register coupled to the DFE circuit and the phase interpolator, the register configured to sample the sequence of sampled symbols from the filtered signal of the DFE circuit at the variable phase from the phase interpolator;
a serial-in parallel-out buffer configured to generate a plurality of words from the sequence of sampled symbols; and
wherein the eye-scan controller is coupled to the phase interpolator and is configured to set the offset value as a function of the variable phase from each of the plurality of value combinations.

7. The circuit of claim 1, wherein the clock signal and another clock signal are asynchronous, and the communication signal provides a sequence of symbols that is synchronized to the other clock signal; and the CDR circuit includes:
a first phase interpolator configured to generate the variable phase from the clock signal as a function of a first offset value;
a data register coupled to the DFE circuit and the first phase interpolator, the data register configured to sample the filtered signal of the DFE circuit at the variable phase from the first phase interpolator and store the sequence of sampled symbols;
a serial-in parallel-out buffer configured to generate a plurality of words from the sequence of sampled symbols;
a second phase interpolator configured to generate another variable phase from the clock signal as a function of a second offset value;
an edge-sampling register coupled to the DFE circuit and the second phase interpolator, the edge-sampling register configured to sample the filtered signal at the other variable phase from the second phase interpolator and store another sequence of sampled symbols;
an alignment circuit coupled to the first and second phase interpolators and the data and edge-sampling registers, the alignment circuit configured to vary the second offset value to keep the other variable phase aligned with a plurality of transitions of the filtered signal, and configured to vary the second offset value in response to a comparison of the sequence of sampled symbols and the other sequence of sampled symbols; and wherein the eye-scan controller is coupled to the alignment circuit and further configured to set the first offset value equal to the second offset value plus a specification of the variable phase in each of the plurality of value combinations.

8. The circuit of claim 1, wherein the data checker includes:

a linear feedback shift register configured to generate a first sequence of pseudo-random binary symbols that matches a second sequence of pseudo-random binary symbols transmitted via the communication signal, the pseudo-random binary symbols in the first sequence shifted as a function of an alignment signal;

a comparator coupled to the CDR circuit and the linear feedback shift register, the comparator configured to generate an indication of whether or not the first sequence currently matches the sequence of sampled symbols from the CDR circuit; and a synchronization circuit coupled to the linear feedback shift register and the comparator, the synchronization circuit configured to generate the alignment signal that shifts the first sequence until the indication indicates that the first sequence currently matches the sequence of sampled symbols.

9. The circuit of claim 1, wherein:

the variable weighting of the operating point is a median of the variable weighting of a first subset of the plurality of value combinations;

the variable phase of the operating point is a median of the variable phase of a second subset of the plurality of value combinations;

the plurality of value combinations in the first subset has the variable phase of the operating point and has the variable weighting in a contiguous range for which the indication indicates the lack of the error during the time interval; and the plurality of value combinations in the second subset has the variable weighting of the operating point and has the variable phase in a contiguous range for which the indication indicates the lack of the error during the time interval.

10. A communication characterization circuit, comprising:

a transmitter configured to serially transmit a first sequence of pseudo-random binary symbols on a communication signal; and a receiver coupled to the transmitter via the communication signal, the receiver including:

a decision feedback equalizer (DFE) circuit configured to generate a filtered signal from the communication signal, wherein the filtered signal is a sum of the communication signal and a variable weighting of a binary symbol recently sampled from the filtered signal;

a clock-and-data recovery (CDR) circuit coupled to the DFE circuit, the CDR circuit configured to produce a second sequence of sampled binary symbols from sampling the filtered signal at a variable phase relative to a clock signal;

a data checker coupled to the CDR circuit, the data checker configured to generate a third sequence of pseudo-random binary symbols and to generate an indication of an error in the second sequence of sampled binary symbols in response to the second sequence of sampled binary symbols not matching the third sequence of pseudo-random binary symbols; and an eye-scan controller coupled to the DFE and CDR circuits and the data checker, wherein the eye-scan controller is configured to vary the variable weighting and the variable phase through a plurality of value combinations, and the eye-scan controller is configured to check for the indication of the error for each of the plurality of value combinations;

wherein the eye-scan controller of the receiver is further configured to select an operating point for the variable weighting and the variable phase as a function of the indications of the error for each of the plurality of value combinations; and wherein after the eye-scan controller selects the operating point:

the transmitter is configured to serially transmit a fourth sequence of binary symbols on the communication signal;

the DFE circuit is configured to generate the filtered signal using the variable weighting of the operating point; and the CDR circuit is configured to sample a fifth sequence of sampled binary symbols from the filtered signal at the variable phase of the operating point.

11. The communication characterization circuit of claim 10, wherein the clock signal and another clock signal are asynchronous, and the transmitter is configured to serially transmit the first sequence of pseudo-random binary symbols in synchronization with the other clock signal.

12. The communication characterization circuit of claim 10, wherein the receiver is a programmable integrated circuit, and the eye-scan controller is implemented within a plurality of programmable logic and interconnect resources of the programmable integrated circuit.

13. A method of characterizing a receiver of a communication signal, comprising:

varying a variable weighting and a variable phase through a plurality of value combinations;

generating a filtered signal from the communication signal, wherein the filtered signal is a sum of the communication signal and the variable weighting, and the variable weighting is a weighting of a binary symbol recently sampled from the filtered signal;

sampling the filtered signal at the variable phase relative to a clock signal to produce a first sequence of sampled binary symbols;

generating a second sequence of pseudo-random binary symbols;

generating an indication of an error in the first sequence of sampled binary symbols in response to the first sequence of sampled binary symbols not matching the second sequence of pseudo-random binary symbols;

checking for the indication of the error for each of the plurality of value combinations;

determining for each value combination of the variable weighting and the variable phase, whether the indication for the value combination indicates a lack of the error in the sequence of sampled symbols during a time interval in which the filtered signal is generated using the variable weighting and the filtered signal is sampled using the variable phase;

storing in a memory a value array including the indication of the error for each of the plurality of value combinations; and selecting an operating point for the variable weighting and the variable phase as a function of the indication of the error for each of the plurality of value combinations.

14. The method of claim 13, wherein the generating of the filtered signal includes sampling the binary symbol recently sampled from the filtered signal at another phase relative to the clock signal, and the other phase is offset one-half a unit interval from each of a plurality of transitions of the filtered signal, the plurality of transitions being separated by multiples of the unit interval.

15. The method of claim 13, wherein the determining of the indication of the error for each of the plurality of value combinations includes determining, for each value combination of the variable weighting and the variable phase, whether the indication for the value combination indicates a lack of the error in the first sequence of sampled symbols during a time interval in which the filtered signal is generated using the variable weighting and the first sequence of sampled signals is sampled using the variable phase.

\* \* \* \* \*